(12) United States Patent
Wilkins et al.

(10) Patent No.: US 7,434,698 B2
(45) Date of Patent: Oct. 14, 2008

(54) TWO FIBER FILTRATION MATERIAL

(75) Inventors: Rodney R. Wilkins, Granville, OH (US); K. Dale Montgomery, Garner, NC (US); Stephen W. Alexander, Basking Ridge, NJ (US); James G. Tuttle, Newburgh, NY (US); Edwin G. Hoel, Inverness, IL (US)

(73) Assignee: Ahlstrom Air Media LLC, Windsor Locks, CT (US)

( * ) Notice: Subject to any disclaimer, the term of this patent is extended or adjusted under 35 U.S.C. 154(b) by 581 days.

(21) Appl. No.: 10/750,473

(22) Filed: Dec. 31, 2003

(65) Prior Publication Data

US 2004/0194625 A1 Oct. 7, 2004

(51) Int. Cl.
*B01D 39/16* (2006.01)

(52) U.S. Cl. ............... 210/505; 210/508; 55/527

(58) Field of Classification Search ....... 252/8.81–8.86; 210/503, 505; 55/527–528; 95/285
See application file for complete search history.

(56) References Cited

U.S. PATENT DOCUMENTS

| | | | |
|---|---|---|---|
| 4,798,850 A | 1/1989 | Brown | |
| 5,368,734 A * | 11/1994 | Wnenchak | 210/505 |
| 5,470,485 A | 11/1995 | Morweiser et al. | |
| 5,792,242 A | 8/1998 | Haskett | |
| 6,211,100 B1 * | 4/2001 | Legare | 442/36 |
| 6,328,788 B1 | 12/2001 | Auger | |
| 6,623,548 B1 | 9/2003 | Gordon et al. | |

FOREIGN PATENT DOCUMENTS

| | | |
|---|---|---|
| WO | 9603483 | 11/1996 |
| WO | WO9636483 | 11/1996 |
| WO | 0004216 | 1/2000 |
| WO | WO0004216 | 1/2000 |

* cited by examiner

*Primary Examiner*—Terry K Cecil
(74) *Attorney, Agent, or Firm*—Jason H. Foster; Kremblas, Foster, Phillips & Pollick

(57) ABSTRACT

A filtration material comprising a blend of at least two types of fibers: (a) polypropylene fibers and (b) either acrylic or modacrylic fibers. In a preferred embodiment, the blend contains about 50 weight percent polypropylene fibers and about 50 weight percent modacrylic fibers. In another preferred embodiment, the blend contains about 50 weight percent polypropylene fibers and about 50 weight percent acrylic fibers. The fibers can be blended ranging from 90:10 to 10:90 polypropylene to acrylic or modacrylic. At least one type of fibers includes an extractable agent on the outer surfaces thereof. Performance of the blend is superior to the prior art filtration materials, especially at the preferred compositions.

29 Claims, 1 Drawing Sheet

| Sample No. | Penetration (15 min.) | Percent Asota PP | Percent FSI PP | Percent Std. PP | Percent Modacrylic | Percent Acrylic | Comments |
|---|---|---|---|---|---|---|---|
| 3 | 2.09% | 50 | - | - | 50 | - | |
| 5 | 3.85% | 50 | - | - | - | 50 | |
| 2 | 4.36% | - | 50 | - | 50 | - | |
| 1 | 8.30% | - | - | 50 | 50 | - | Brown |
| 4 | 15.35% | - | - | 50 | - | 50 | Brown |
| 6 | 19.27% | - | 50 | - | - | 50 | |
| 7 | | 10 | - | - | 90 | - | |
| 8 | | 90 | - | - | 10 | - | |
| 9 | | - | 10 | - | 90 | - | |
| 10 | | - | 90 | - | 10 | - | |
| 11 | | - | - | 10 | 90 | - | Brown |
| 12 | | - | - | 90 | 10 | - | Brown |

| Sample No. | Penetration (15 min.) | Percent Asota PP | Percent FSI PP | Percent Std. PP | Percent Modacrylic | Percent Acrylic | Comments |
|---|---|---|---|---|---|---|---|
| 3 | 2.09% | 50 | - | - | 50 | - | |
| 5 | 3.85% | 50 | - | - | - | 50 | |
| 2 | 4.36% | - | 50 | - | 50 | - | |
| 1 | 8.30% | - | - | 50 | 50 | - | Brown |
| 4 | 15.35% | - | - | 50 | - | 50 | Brown |
| 6 | 19.27% | - | 50 | - | - | 50 | |
| 7 | | 10 | - | - | 90 | - | |
| 8 | | 90 | - | - | 10 | - | |
| 9 | | - | 10 | - | 90 | - | |
| 10 | | - | 90 | - | 10 | - | |
| 11 | | - | - | 10 | 90 | - | Brown |
| 12 | | - | - | 90 | 10 | - | Brown |

Fig. 1

TWO FIBER FILTRATION MATERIAL

BACKGROUND OF THE INVENTION

1. Field of the Invention

This invention relates generally to filtration material, and more particularly to a filtration media comprising two types of fibers blended and holding an electrostatic charge.

2. Description of the Related Art

It is known in the filtration art that various kinds of fibers can be formed into a web or other structure with small, tortuous paths through which gases, such as air, are passed to remove particulate matter from the gas stream. The particulate matter in the gas flowing through the paths in the web is retained on the upstream side of the web or within the paths of the web due to the size of the particles being larger than the paths' diameters.

Furthermore, it is known to electrostatically charge various blends of fibers to further retain particulate matter through electrostatic attraction between the fibers and the particles. Such blends are shown in U.S. Pat. No. 6,328,788 to Auger, U.S. Pat. No. 4,798,850 to Brown, U.S. Pat. No. 5,470,485 to Morweiser, et al., and U.S. Pat. No. 5,792,242 to Haskett, all of which are incorporated herein by reference.

The Brown patent discloses a blend of two types of fibers: polyolefin and a substituted additional polymer. The first fiber in Brown is preferably polypropylene and the second is modacrylic. The preferred range of surface area ratios (polypropylene to modacrylic) in Brown is 30:70 to 80:20, and more preferably 40:60 to 70:30.

Furthermore, the polypropylene fibers used in the Brown patent are clean, which is described in the patent as follows: "By 'clean' we mean that the fibre has no coating of lubricant or anti-static agent, or that any such coating was removed before blending, for example, by scouring with a non-ionic detergent." Thus, the fibers of the Brown patent are without lubricant or anti-static agent, typically by being manufactured with a finish and subsequently removing the finish by scouring. However, the step of cleaning fibers adds cost to the finished filtration product and may deleteriously affect the fibers.

U.S. Pat. No. 6,623,548 to Gordon discloses an electrostatically charged filter material comprising a blend of polypropylene fibers and (a) halogen free acrylic fibers or (b) polyvinyl chloride (PVC) fibers or (c) a mixture of PVC and halogen free acrylic fibers. In this patent, the fibers are also cleaned to remove antistatic and lubricant agents. This is described in the Gordon patent as follows: "In practise, polymer fibres produced commercially have spin finishes, and thus it is necessary to substantially remove lubricants and anti-static agents from the fibres before, during or [ ] after the blending of said fibres."

The prior art filtration materials provide sufficient filtration for many environments. However, where the electrostatic charge must be retained for long periods or where the penetration through the filtration material must be below a particular percentage, the prior art does not suffice, or is prohibitively expensive to manufacture due to the need for the scouring step. Therefore, the need exists for a filtration material that provides the needed performance at a feasible cost to manufacture.

BRIEF SUMMARY OF THE INVENTION

It has been discovered that a combination of two fibers can be blended to form a filtration material that has superior performance to the filtration materials of the prior art. The two fiber types include polypropylene and a second type selected from the group of modacrylic and acrylic. In a preferred embodiment, the ratio of polypropylene to modacrylic is about 50:50. The range, however, of acceptable ratios is between about 90:10 to about 10:90. A preferred ratio of polypropylene to acrylic is about 50:50, although the range can be between 90:10 and 10:90. The preferred polypropylene has a measurable amount of extractable agents on it.

BRIEF DESCRIPTION OF THE SEVERAL VIEWS OF THE DRAWINGS

FIG. 1 is a table of experimental data for samples embodying the invention at various fiber compositions.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose.

DETAILED DESCRIPTION OF THE INVENTION

The invention is a blend of two types of fibers—polypropylene and either acrylic or modacrylic. The polypropylene fibers have a small amount of an agent on the outer surface of the fibers, and the agent can be an antistatic, lubricating or one of many other agents that are commonly referred to as "extractables" or "extractable agents", due to their ability to be extracted from the fibers, such as by the well-known alcohol-extraction method: The polypropylene fibers are preferably relatively clean, meaning there are only small amounts of extractable agents on them. This amount is, for example, in the range of about 0.02 to about 0.1 percent by weight, or some other measurable amount. The fibers can be cleaned to remove most of the agent, or they can be formed in a process that leaves little or no such extractable agents. Extractable agents can be added to an essentially clean fiber as desired. Fibers made with small amounts of extractable agents are commonly referred to as "low finish" or "no finish" fibers.

The preferred polypropylene fibers are sold by Asota Ges.m.b.H. of Austria. The fibers used in the tests were 2.25 denier by 1 and one-half inch long polypropylene fibers with the part number type FV1X0Z. These fibers have small amounts of extractable agents, presumed to be antistatic or lubricating agents, and are made in a manufacturing process that uses water (distilled or de-ionized) as a lubricant. The fibers, although they contain extractables, function in the present invention better than fibers that have been scoured to remove essentially all of the extractables. If any other manufacturing process is developed that leaves little or no extractables on the fiber surfaces, it is contemplated that such fibers could be used instead of the currently preferred fibers.

As is well known in the textile industry, acrylic is a manufactured fiber in which the fiber-forming substance is any long chain synthetic polymer composed of at least 85 percent by weight of acrylonitrile units. Furthermore, modacrylic is a manufactured fiber in which the fiber-forming substance is any long chain synthetic polymer composed of less than 85 percent but at least 35 percent by weight of acrylonitrile units. The acrylic and modacrylic fibers used in the present invention fall within these ranges.

Modacrylic fibers used in the tests described herein were 2.0 denier by 2 inches long and sold under the trademark KANEKARON style SE, which is sold by the Kaneka Corporation, Osaka Japan. The fiber was cleaned by washing in a solution of about 4% sodium carbonate by weight in water. The fibers were then rinsed and dried. The acrylic fiber used in the tests is manufactured by Solutia, Inc., style A17879. This is a semi-dull fiber, 3.0 denier by 2 inches long. The fiber was cleaned by washing in a solution of approximately 4% sodium carbonate by weight in water. The fibers were then rinsed and dried. Notwithstanding the fact that these fibers were cleaned, it is anticipated that if a process is developed that can produce low or no finish acrylic or modacrylic fibers, such fibers could be used in combination with low or no finish polypropylene or even standard polypropylene that has been scoured and would produce an advantageous product. It is also contemplated that solution spun fibers and dry spun fibers can be used in the invention.

The polypropylene fibers are blended with either the modacrylic or the acrylic fibers preferably to form a non-woven web. The fibers could be weaved or otherwise formed into a sheet, panel, batt or other configuration. The web is preferably made by blending the fibers in a conventional manner and then carding so that the fibers rub together to impart an electrostatic charge that remains long after manufacture. Alternatively, the web could be blended and then a charge imparted by a corona or an electric field, or such a charge could be imparted prior to blending. It has been discovered that a web formed according to the present invention maintains an electrostatic charge for a significant period.

Samples of webs embodying the instant invention have been tested and the results are compiled in the table shown in FIG. 1. The tests were performed on a TSI 8130, a well-known machine for testing filtration characteristics of materials. The tests were performed under conditions of 90 liters per minute of air flow, with samples of approximately 6 inches wide by 6 inches long having a weight of approximately 8.0 grams. The resulting penetration of DOP (dioctyl pthalate) oil is measured at 15 minutes duration, and has been recorded in the table of FIG. 1. Because the results obtained are the percentage of the oil that penetrates the filtration material, the lower the penetration number, the better the filtration material performed. The rows in FIG. 1 are arranged in order of sample performance.

It should be noted that samples 1 and 4 of FIG. 1 have fiber types and compositions similar to the filtration material described in U.S. Pat. No. 4,798,850 to Brown. Thus, the present invention's performance, as shown in samples 3 and 5, can be compared to the performance of the prior art. Samples with unscoured polypropylene fibers with a measurable amount of extractable agent result in significantly lower penetration amounts than the samples with similar percentages of scoured polypropylene.

Samples 2, 3 and 5 of FIG. 1 are made according to the invention. These samples had significantly better performance than samples 1 and 4, which represent the prior art. This shows that a filtration material can be made without the added expense of cleaning the polypropylene fibers. Indeed, the polypropylene fibers used in the present invention had measurable quantities of an extractable agent, but performed substantially better than the products made according to the prior art. It is not fully understood why a product that has measurable quantities of extractable agents performs better than a product with the extractables removed by scouring. It is theorized that the scouring process may etch or otherwise deleteriously affect the fibers themselves, or leave other contaminants that affect the resulting filter's performance. Thus, it is contemplated that a low or no finish modacrylic or acrylic would produce good results with a low or no finish polypropylene or even a scoured polypropylene, if a process for making such fibers is developed.

While certain preferred embodiments of the present invention have been disclosed in detail, it is to be understood that various modifications may be adopted without departing from the spirit of the invention or scope of the following claims.

The invention claimed is:

1. A filter material comprising a blend of (a) polypropylene fibers with measurable amounts of at least one extractable agent on outer surfaces thereof, and (b) fibers of a second type selected from a group consisting of acrylic and modacrylic, wherein the measurable amount of said at least one extractable agent is within a range of about 0.02 to about 0.1 weight percent, and wherein said at least one extractable agent is an agent used in a process to make fibers and is selected from a group consisting of lubricant and an anti-static agent.

2. The filter material in accordance with claim 1, wherein the blend contains polypropylene fibers and the second type of fibers in a ratio between about 10:90 and about 90:10.

3. The filter material in accordance with claim 2, wherein the blend contains polypropylene fibers and the second type of fibers in a ratio between about 20:80 and about 80:20.

4. The filter material in accordance with claim 3, wherein the blend contains polypropylene fibers and the second type of fibers in a ratio between about 30:70 and about 70:30.

5. The filter material in accordance with claim 4, wherein the blend contains polypropylene fibers and the second type of fibers in a ratio between about 40:60 and about 60:40.

6. The filter material in accordance with claim 5, wherein the blend contains polypropylene fibers and the second type of fibers in a ratio between about 45:55 and about 55:45.

7. The filter material in accordance with claim 6, wherein the blend comprises about 50 weight percent polypropylene fibers and about 50 weight percent of the second type of fibers.

8. The filter material in accordance with claim 1, wherein the blend contains polypropylene fibers and acrylic fibers in a ratio between about 20:80 and about 80:20.

9. The filter material in accordance with claim 8, wherein the blend contains polypropylene fibers and acrylic fibers in a ratio between about 30:70 and about 70:30.

10. The filter material in accordance with claim 9, wherein the blend contains polypropylene fibers and acrylic fibers in a ratio between about 40:60 and about 60:40.

11. The filter material in accordance with claim 10, wherein the blend contains polypropylene fibers and acrylic fibers in a ratio between about 45:55 and about 55:45.

12. The filter material in accordance with claim 11, wherein the blend comprises about 50 weight percent polypropylene fibers and about 50 weight percent acrylic fibers.

13. The filter material in accordance with claim 1, wherein the blend contains polypropylene fibers and modacrylic fibers in a ratio between about 20:80 and about 80:20.

14. The filter material in accordance with claim 13, wherein the blend contains polypropylene fibers and modacrylic fibers in a ratio between about 30:70 and about 70:30.

15. The filter material in accordance with claim 14, wherein the blend contains polypropylene fibers and modacrylic fibers in a ratio between about 40:60 and about 60:40.

16. The filter material in accordance with claim 15, wherein the blend contains polypropylene fibers and modacrylic fibers in a ratio between about 45:55 and about 55:45.

17. The filter material in accordance with claim 16, wherein the blend comprises about 50 weight percent polypropylene fibers and about 50 weight percent modacrylic fibers.

18. The filter material in accordance with claim 1, wherein the second type of fibers comprises acrylic fibers which are substantially free of extractable agents.

19. The filter material in accordance with claim 1, wherein the second type of fibers comprises acrylic fibers which contain measurable amounts of at least one extractable agent.

20. The filter material in accordance with claim 19, wherein said at least one extractable agent is an agent used in a process to make the acrylic fibers.

21. The filter material in accordance with claim 1, wherein the second type of fibers comprises modacrylic fibers which are substantially free of extractable agents.

22. The filter material in accordance with claim 1, wherein the second type of fibers comprises modacrylic fibers which contain measurable amounts of at least one extractable agent.

23. The filter material in accordance with claim 22, wherein said at least one extractable agent is an agent used in a process to make the modacrylic fibers.

24. The filter material in accordance with claim 1, wherein the polypropylene fibers are not cleaned to remove said at least one extractable agent.

25. The filter material in accordance with claim 1, wherein said at least one extractable agent is an agent used in a process to make the polypropylene fibers.

26. A filter material comprising a blend of (a) polypropylene fibers, and (b) fibers of a second type with about 0.02 to about 0.1 weight percent of at least one extractable agent on outer surfaces thereof, said fibers being selected from a group consisting of acrylic and modacrylic, and wherein said at least one extractable agent is an agent used in a process to make fibers and is selected from a group consisting of lubricant and an anti-static agent.

27. The filter material in accordance with claim 26, wherein the polypropylene fibers have measurable amounts of at least one extractable agent on outer surfaces thereof.

28. The filter material in accordance with claim 26, wherein said at least one extractable agent is an agent used in a process to make the fibers of a second type.

29. The filter material in accordance with claim 27, wherein said at least one extractable agent is an agent used in a process to make the polypropylene fibers.

* * * * *